United States Patent [19]

David

[11] Patent Number: 4,861,451
[45] Date of Patent: Aug. 29, 1989

[54] CHLORINATOR CELL

[75] Inventor: Lennie F. David, Victoria, Australia

[73] Assignee: Hammond Royce Corporation Pty. Limited, Victoria, Australia

[21] Appl. No.: 123,731

[22] Filed: Nov. 23, 1987

[51] Int. Cl.⁴ .......................... C25B 9/00; C25B 15/08
[52] U.S. Cl. ...................................... 204/230; 204/231; 204/269; 204/270; 204/278
[58] Field of Search .............................. 204/228–229, 204/129, 275, 278, 270, 269, 230–231

[56] References Cited

U.S. PATENT DOCUMENTS

| | | | |
|---|---|---|---|
| 1,380,183 | 5/1921 | Boisen | 204/278 |
| 2,098,629 | 11/1937 | Knowlton | 204/278 X |
| 2,701,790 | 2/1955 | Goument | 204/278 X |
| 2,784,559 | 3/1957 | Kajmo | 204/129 X |
| 3,527,687 | 9/1970 | Subbotin | 204/230 X |
| 3,616,436 | 10/1971 | Haas | 204/129 X |
| 3,761,221 | 9/1973 | Stillions | 204/278 X |

FOREIGN PATENT DOCUMENTS 383566 11/1932 United Kingdom ................ 204/230

Primary Examiner—Donald R. Valentine
Attorney, Agent, or Firm—Larson & Taylor

[57] ABSTRACT

An electrolytic cell having a body adapted to be located so that the inlet and outlet are each on or adjacent the lower surface thereof and including electrodes whereby electrolysis of water passing through the cell can be effected, the arrangement being such that, if the water remains in the cell, then gas formed will displace water from the electrode so as to reduce, and finally stop, electrolysis.

The cell may also have a third electrode which is located in the cell adjacent the upper surface thereof, which is in connection with one of the other electrodes, the resistance between the two electrodes being low when the cell is full of liquid, but high when gas displaces the liquid and exposes the third electrode.

6 Claims, 2 Drawing Sheets

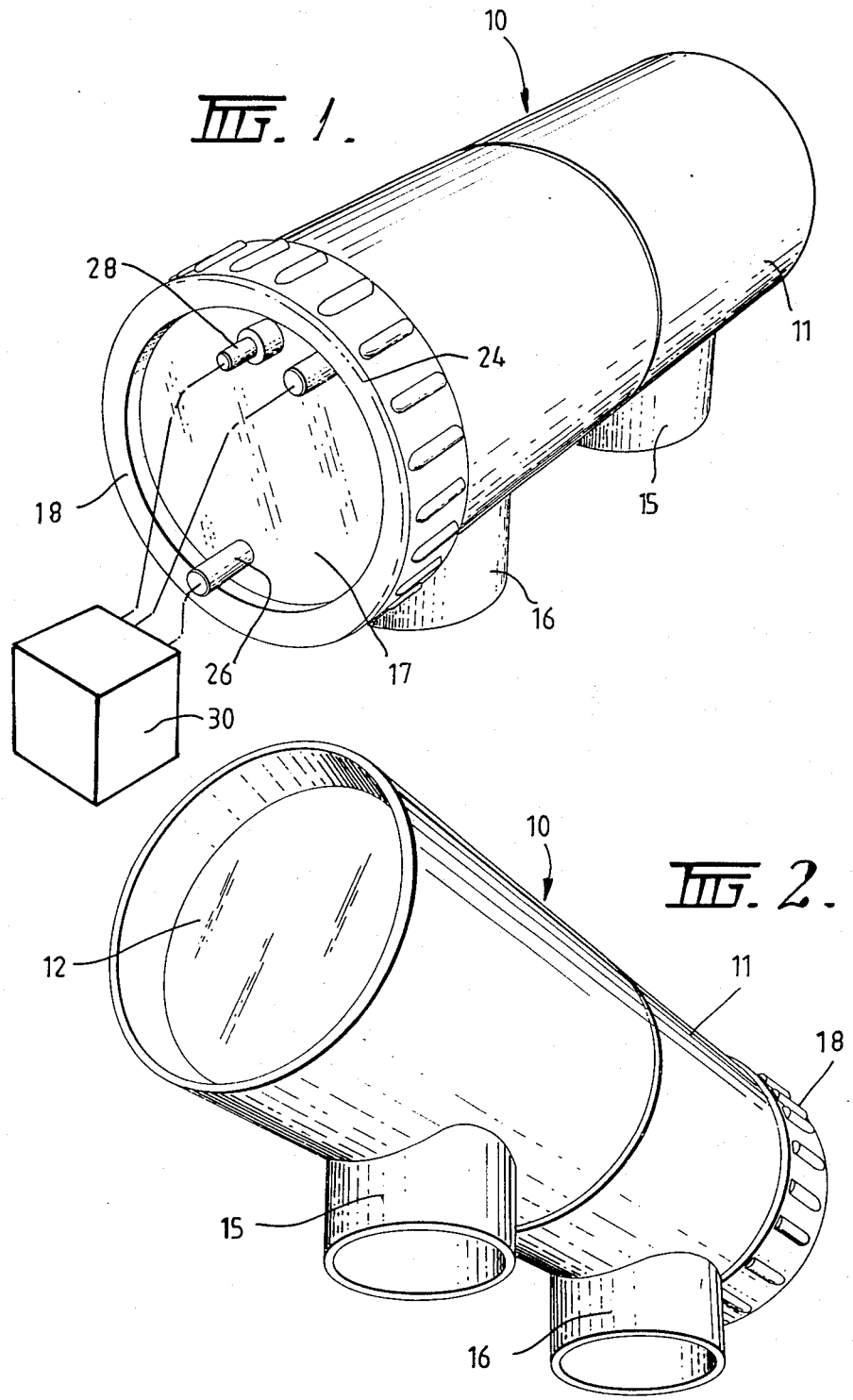

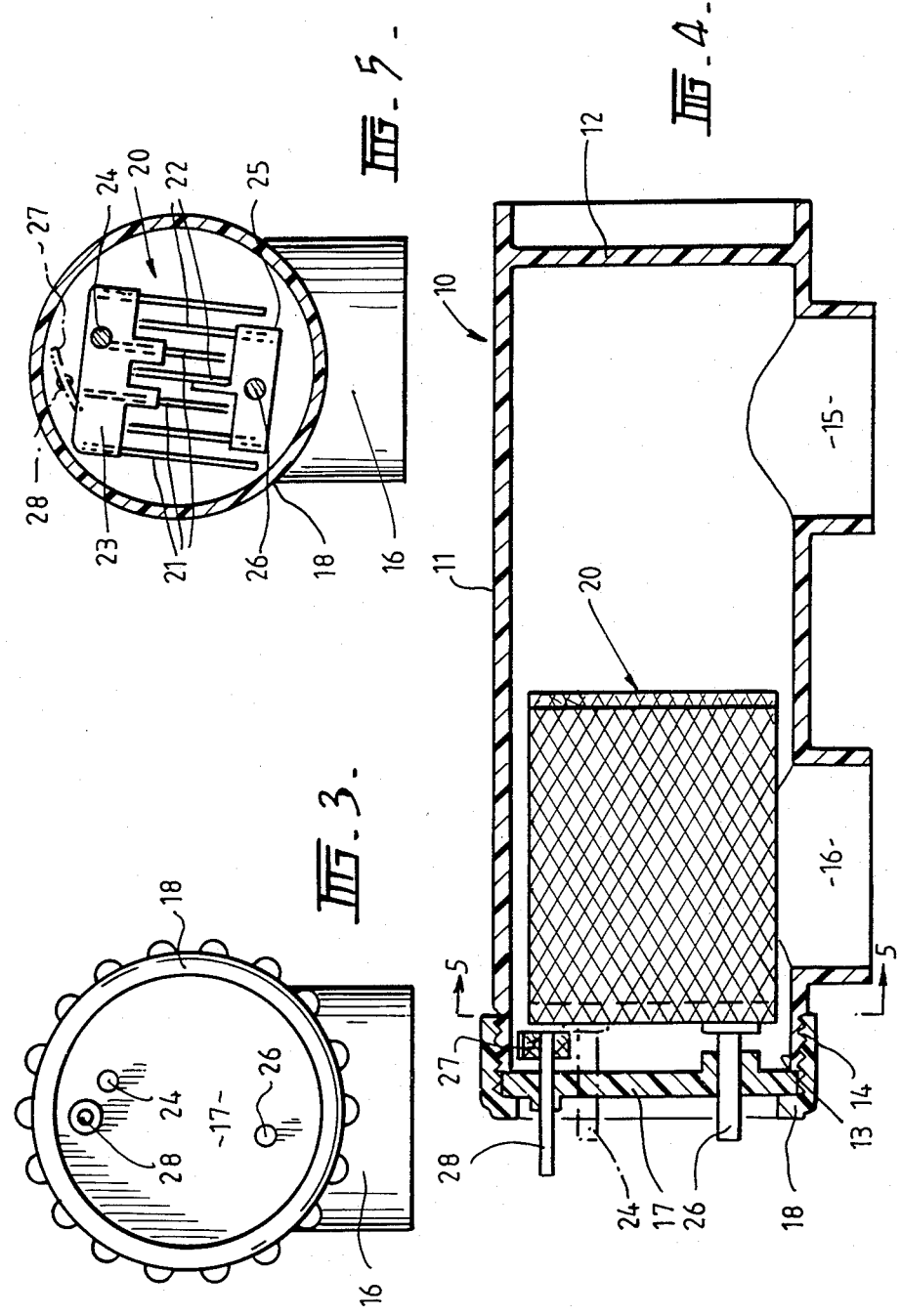

CHLORINATOR CELL

This invention relates to an electrolytic-cell and, in particular, to an electrolyctic cell for use as a chlorinator in swimming pools and the like.

Electrolytic chlorination of swimming pools is known.

In such systems common salt is added to the water of the pool and an electrolytic cell is provided in the filter system, either as a flow through or by-pass arrangement, in which, by electrolysis, chlorine is released into the water.

In this process, hydrogen is also formed but, under normal operations, the quantity of hydrogen is slight and it is transmitted with the water into the pool, where it simply passes to atmosphere.

Previous cells have had difficulties when, for example, the pool pump ceases operation but the cell continues electrolysis.

When this occurs, there tends to be a build up of hydrogen, either in the cell itself, or, on occasions, the filter and, indeed, if electrolysis is permitted to continue for a substantial time, a reservoir of hydrogen can build up and this can lead to a situation which is explosive.

The present invention is adapted to obviate this.

In its first aspect the invention provides an electrolytic cell having a body, an inlet into and an outlet from the body, both the inlet and outlet being on the lower surface of the body, electrodes located within the body and having conductors extending outwardly therefrom, the arrangement being such that, if there is any build up of gas within the body, then the liquid in the body is displaced by the gas, thereby exposing part of the electrodes, thus reducing the amount of electrolysis until, when the electrodes are fully exposed, electrolysis ceases completely.

It is also preferred to provide such an arrangement whereby there is an additional, sensing, electrode which is connected across a detector circuit to one of the other electrodes so that, when the sensing electrode is exposed, then the power to the cell is removed.

In order that the invention may be more readily understood, reference will be made to the accompanying drawings, in which:

FIG. 1 is a perspective view of the cell of the invention from above;

FIG. 2 is a perspective from beneath;

FIG. 3 is an end view showing the arrangement of the conductors;

FIG. 4 is a section through the body showing the location of the electrodes; and FIG. 5 is a section along line 5—5 of FIG. 4.

The cell of the invention is adapted to be located in the filter line and comprises a body 10 which may be a synthetic plastics material but certainly must be of a material which is resistant to corrosion in a chlorinated environment.

As illustrated, the body has a cylindrical shell 11 which has one closed end 12 and an open end 13 which is illustrated as having an external screw thread 14 thereon.

It has an inlet 15 and an outlet 16 which are located pointing downwardly when the body is in its normal operating position with its axis horizontal.

Located in the open outer end 13 there is an electrode bundle 20 which comprises two sets of spaced electrodes 21, 22, the electrodes 21 being connected to a first support 23 and a conductor 24, and the electrodes 22 being connected to a second support 25 and conductor 26.

The conductors 24 and 26 extend through an end plate 17 which carries the electrode bundle and which is adapted to close the open end 13 of the cylindrical portion 11 and to be retained thereon by a screw threaded cap 18.

Also connected to the end plate 17 is an additional electrode 27, which is connected to a conductor 28 which extends through the plate. The electrode 27 is located adjacent the top of the shell 11.

The conductors 24, 26 and 28 are associated with connectors, not shown, whereby they are interconnected to a power supply 30, illustrated schematically in FIG. 1.

The power supply comprises a transformer and a rectifier, whereby normal household mains voltage can be converted to relatively low voltage direct current and this is applied across the conductors 24 and 26 and thus to the electrodes 21 and 22 respectively.

In normal operation there is a substantial quantity of water passed through the cell as, as explained previously, it is in the line to the pump filter and, as this water is saline, as it has had added to it a predetermined quantity of sodium chloride, electrolysis occurs across the electrodes 21,22, chlorine is formed and is dissolved in the water, and hydrogen which is carried by the water in suspension is also formed.

The hydrogen is in the form of very small bubbles and, normally, when the water is delivered to the pool, the hydrogen is released to atmosphere.

If the chlorinator is left operating when the filter pump is not operating, which should be avoided by having it switched with the filter pump, or, more importantly, if the pump breaks down whilst the chlorinator is operating, it will be appreciated that there is no throughput of water and there can tend to be a build up of hydrogen gas in the cell.

In the cell of the invention this causes two independent effects.

The first, and most direct, is that the hydrogen rises to the top of the cell and, as the cell is sealed, this will cause a displacement downwardly of water and, as the amount of hydrogen builds up, so the upper portion of the electrode bundle is exposed, thus restricting the area over which electrolysis can occur and, on further build up, more and more of the electrodes are exposed, there is less hydrogen build up, until the cell is effectively full of hydrogen and the electrodes are fully exposed, at which time electrolysis will cease completely.

The cell of the invention thus provides a limit to the amount of hydrogen which can be produced and, at the same time, contains the hydrogen within its body.

This means that, if there is some failure in the system, when this is being repaired simply by removing the end cap 18 of the cell, the hydrogen can be vented to atmosphere and any likelihood of explosion mitigated.

We also provide a second form of safety arrangement which should operate prior to the completion of the mechanism just described and that is by means of the additional electrode 27.

As previously mentioned this is connected by way of conductor 28 to the controller 30 and, in the controller, means are provided whereby the resistance between the electrode 13 and one of the electrode sets 21 or 22 is measured.

It will be appreciated that, as long as the cell is full of water, there will be a conductive path, because the water with dissolved sodium chloride is conductive, and thus the resistance between the electrode 27 and the electrode set will be relatively low.

As soon as there is a build up of hydrogen in the upper part of the body of the cell, the electrode 27 will be exposed and the resistance of this path will go high and the controller contains circuitry whereby, on increase of resistance of this path, the power to the cell is removed.

Thus, in practice, although the cell is effectively self-extinguishing, if there is a pump failure, there should not be a build up of hydrogen in the cell beyond that necessary to cause complete exposure of the electrode 27.

It will thus be seen that the cell of the invention firstly contains any hydrogen therein, secondly, prevents the formation of more than a predetermined quantity of hydrogen before power to the cell is interrupted and, thirdly, should there be some breakdown in this, as could occur either with a physical connection between the electrode 27 and the other electrodes between which the resistance is checked, there will be a restriction on the amount of hydrogen which can be formed as electrolysis slows down and then ceases when there is a hydrogen build up.

It will thus be seen that the cell of the invention restricts the transmission of hydrogen to any other part of the filter circuit and operates in what is designed to be a fall-safe manner.

I claim:

1. An electrolyte cell comprising an elongated body adapted to be disposed with the longitudinal axis thereof horizontal, an inlet into and an outlet from the body, both the inlet and outlet being on the lower surface of the body, electrodes located within the body and having conductors extending outwardly therefrom, the arrangement being such that, if there is any build up of gas within the body, then the liquid in the body is displaced by the gas, thereby exposing part of the electrodes, thus reducing the amount of electrolysis until, when the electrodes are fully exposed, electrolysis ceases completely.

2. An electrolytic cell as claimed in claim 1 wherein the body is cylindrical.

3. An electrolytic cell as claimed in claim 2 wherein the electrodes are connected to an end plate which is fitted to and retained on an open end of the body.

4. An electrolytic cell as claimed in claim 1 wherein there is a third electrode within the body and adjacent the upper surface thereof.

5. An electrolytic cell as claimed in claim 4 wherein a control means measures the resistance between the third electrode and one of the other electrodes and, when this resistance becomes high, electrolysis is interrupted.

6. An electrolytic cell comprising a hollow elongated body which, in use, is disposed with the longitudinal axis thereof horizontal and which includes, in the lower surface thereof, an inlet through which liquid can pass into the body and an outlet from which liquid in the body can exit; at least two electrodes located within said body for producing electrolysis of liquid in contact therewith, said body and said electrodes being such constructed and arranged that the electrodes will be increasingly exposed, and the amount of electrolysis accordingly reduced, in response to liquid in the body being displaced by gas during any build up of gas within the body, until the electrodes are fully exposed, and electrolysis thus ceases; and conductor means for connecting said electrodes to a power supply.

* * * * *